US012658556B2

(12) United States Patent
Yang

(10) Patent No.: US 12,658,556 B2
(45) Date of Patent: Jun. 16, 2026

(54) ANTENNA PACKAGING STRUCTURE

(71) Applicant: Shenzhen Antop Technology Co., Ltd., Shenzhen (CN)

(72) Inventor: Ruidian Yang, Shenzhen (CN)

(73) Assignee: SHENZHEN ANTOP TECHNOLOGY CO., LTD., Shenzhen (CN)

( * ) Notice: Subject to any disclaimer, the term of this patent is extended or adjusted under 35 U.S.C. 154(b) by 69 days.

(21) Appl. No.: 18/913,393

(22) Filed: Oct. 11, 2024

(65) Prior Publication Data

US 2025/0350016 A1 Nov. 13, 2025

(30) Foreign Application Priority Data

May 9, 2024 (CN) ......................... 202421027918.0

(51) Int. Cl.
*H01Q 1/08* (2006.01)
*H01Q 1/38* (2006.01)
*H01Q 9/28* (2006.01)

(52) U.S. Cl.
CPC ............... *H01Q 1/085* (2013.01); *H01Q 1/38* (2013.01); *H01Q 9/285* (2013.01)

(58) Field of Classification Search
CPC .......... H01Q 1/08; H01Q 1/085; H01Q 1/087; H01Q 1/1235; H01Q 1/20; H01Q 1/288; H01Q 1/38; H01Q 9/285
See application file for complete search history.

(56) References Cited

U.S. PATENT DOCUMENTS 3,577,196 A * 5/1971 Pereda .................. H01Q 1/087 343/915
4,987,424 A * 1/1991 Tamura .................. H01Q 1/085 343/803

* cited by examiner

*Primary Examiner* — Robert Karacsony
(74) *Attorney, Agent, or Firm* — MUNCY, GEISSLER, OLDS & LOWE, P.C.

(57) ABSTRACT

An antenna packaging structure includes a packaging container and an antenna contained in the packaging container. The antenna includes a flexible substrate, an antenna element disposed on the flexible substrate, a feeder structure connected to the antenna element, and a coaxial cable connected to the feeder structure. The flexible substrate of the antenna is rolled into a cylindrical structure, with the antenna element rolled together with the flexible substrate and retained electrical properties after unrolled, the feeder structure is disposed inside or to a side of the cylinder structure, and the coaxial cable is disposed inside the cylinder structure or between the cylinder structure and the packaging container. The present disclosure can effectively ensure safety and stability of the antenna during transportation and storage, reduce risk of damage due to external forces or environmental factors, provide compressed space occupied, and correspondingly improve efficiency of transportation and storage.

14 Claims, 6 Drawing Sheets

ANTENNA PACKAGING STRUCTURE

CROSS REFERENCE TO RELATED APPLICATIONS

The present application claims priority from Chinese Application No. CN 202421027918.0 filed on May 9, 2024, all of which are hereby incorporated herein by reference.

TECHNICAL FIELD

The present disclosure relates to the field of antenna technology, and specifically relates to an antenna packaging structure.

BACKGROUND

In the field of wireless signal reception, a flat panel antenna, as an efficient and widely used radiating unit, is widely used in the fields of television, communication, radio and satellite reception. Flat panel antennas have gained a large share of the market because of simplified structure, light weight, excellent radiation performance, low-profile characteristics and easy installation. With increasing development and popularization of wireless signal reception technology, demands for flat panel antennas are also dramatically increasing. However, traditional flat panel antennas usually have large volume, causing serious problems of packaging and transportation of flat panel antennas, which is required to be urgently resolved.

Existing flat panel antennas are made of rigid materials or small-amplitude bending materials, resulting in large physical dimensions, especially in the unrolled state of the antenna panel, it tends to occupy a large space. Due to large area of the flat panel antenna, such a large-sized flat panel antenna needs to be packaged in a larger box or packaging structure, which not only increases consumption of packaging materials, but also makes the entire packaging structure bulky and unfavorable for handling and storage.

In logistics transportation, large-size packaging structure occupies more space for transportation, and space cost is an important expense, especially in long-distance transportation or air transportation, relatively large packaging volume will significantly increase transportation cost, which leads to reduction of transportation efficiency and increase of transportation cost. In addition, large size of packaging structure also increases risk of breakage or deformation during transportation, which further affects quality and performance of the antenna.

In view of the above problems, large flat antennas in the prior art have inadequacy in terms of transportation and storage. Therefore, there is an urgent need for an improved antenna design capable of reducing transportation and storage costs by changing its physical form.

SUMMARY

The present invention seeks to provide a solution to the before-mentioned problems and provides an antenna packaging structure that can significantly reduce required space, thereby effectively reducing transportation cost.

The antenna packaging structure of the present disclosure includes a packaging container and an antenna contained in the packaging container, the antenna including a flexible substrate, an antenna element disposed on the flexible substrate, a feeder structure connected to the antenna element, and a coaxial cable connected to the feeder structure. In the present disclosure, inside the packaging container, the flexible substrate of the antenna is rolled into a cylindrical structure having a first direction parallel to the axis of the cylinder structure and a second direction perpendicular to the axis of the cylinder structure, the antenna element is rolled with the flexible substrate and retains electrical properties after unrolled, the feeder structure is disposed inside of the cylinder structure or disposed to a side of the cylinder structure, and the coaxial cable is disposed inside the cylinder structure or between the cylinder structure and the packaging container.

By rolling the antenna into a cylinder structure and accommodating it in the packaging container, safety and stability of the antenna during transportation and storage are effectively ensured, and risk of damage caused by external forces or environmental factors is reduced. The design of the packaging structure is further compressed compared to the existing packaging structure of the flat panel antenna, which thus improves efficiency of transportation and storage. Due to characteristics of the flexible substrate, the antenna can restore to its original shape and state after unrolled, which ensures the antenna's performance and usage effect. According to the present disclosure, it only requires users to simply remove the antenna from the packaging container and unroll it for normal use, without any complicated operation or adjustment. In addition, such design is applicable to antennas of various sizes and shapes, wide applicability and flexibility thus can be achieved.

In the present disclosure, the packaging container has an inner cavity matching the dimensions in the first direction and the second direction, with the packaging container being sized in the second direction in such a way as to be able to accommodate the feeder structure.

Designing the inner cavity size of the packaging container to make the inner cavity size matching the size of the antenna in the first direction and the second direction after rolled, a close fit between the packaging and the antenna product can be achieved. In addition, the size of the packaging container in the second direction is designed to subject to accommodate the feeder structure, which can ensure the antenna to be completely stowed in the packaging container under the rolled state, and thus minimizing the volume of the packaging. This precise size matching not only enhances space utilization of the packaging container and reduces unnecessary waste of packaging materials, but also strengthens the protective effect of the packaging on the antenna, which can effectively prevent the antenna from moving or shaking inside the packaging container, ensure stability of the antenna inside the packaging container, and reduce risk of damage due to an external impact during transportation. It should be noted that the packaging container in the present disclosure may be a packaging box, a packaging bag, or other forms of packaging containers formed by blister packs and the like. The packaging container can be designed as hollow polyhedrons such as prisms, frustums of pyramids, pyramids, etc., or as hollow bodies of revolution such as cylinders, frustums of cones, cones, spheres, etc. However, preferably in form of a square-cylindrical or circular-cylindrical structure, As the square-cylindrical or circular-cylindrical structures better matches the shape of the antenna after rolled into the cylindrical structure and better correspond to the shape of the inner cavity, which not only can further improve space utilization of the packaging container and reduce unnecessary waste of packaging materials, but also more convenient for stacking and handling, thereby improving logistical efficiency.

In the present disclosure, the dimensions in the first direction are preferably designed to 3 to 15 times the dimensions in the second direction.

By controlling the size of the first direction to be 3 to 15 times the size of the second direction, it is ensured that the flexible substrate is rolled as short and compact as possible. On the one hand, the size of the first direction needs to be controlled within a certain ratio, so that the antenna will be rolled in the packaging process to make the size of the first direction as smaller as possible after rolled; on the other hand, with size of the second direction much smaller than the first direction, the antenna will be able to form a compact cylinder structure after rolled, which significantly reduces the size of the second direction. Both of the above aspects will significantly reduce the space occupied by the antenna inside the packaging container, so that the packaging container and its inner cavity size can be designed to be smaller both in the first direction and in the second direction, which is very advantageous for saving the transportation and storage space, as well as reducing the cost of packaging. In addition, being compactly rolled can also improve impact strength of the antenna during transportation and storage, which is more favorable to avoiding damage or deformation due to external force during transportation and storage, and is favorable to protecting the flexible substrate of the antenna and the antenna element.

Particularly, the dimensions in the second direction are designed between 1.5 and 8 cm.

With limiting the size of the second direction to a range of 1.5 to 8 cm, the antenna is made to have a moderate and stable size after being rolled into a cylindrical structure. Such a size design is neither too large to cause the packaging container to be too bulky, nor too small to affect performance or structural integrity of the antenna. This moderate size design helps to realize the standardization and unification of the packaging container, and facilitates production, transportation and management. During the rolling process, the moderate size of the second direction ensures a stable relative position of the various components of the antenna and avoids displacement or deformation due to vibration or shock during transportation. This helps protect structural integrity of the antenna and ensures that it will function properly after it is unrolled. After completing the rolling, the moderate size of the second direction also makes the size of the packaging container moderate, which is convenient for sales transportation and storage, as well as convenient for users to carry and move. For users, whether working outdoors or using indoors, it can be easily carried to meet their communication needs anytime and anywhere.

The feeder structure in the present disclosure is disposed in the middle of the flexible substrate or in the middle of the edge of the flexible substrate, separating the flexible substrate into a left substrate and a right substrate, the left substrate and right substrate being rolled towards the feeder structure respectively form a side opposite to the feeder structure.

With regard to an antenna in which the feeder structure is disposed in the middle of the flexible substrate or in the middle of the edge of the flexible substrate, the flexible substrate is naturally separated into a left substrate and a right substrate. In such case, by rolling the left substrate and the right substrate separately toward the feeder structure, the flexible substrate is avoided from forming wrapping around the feeder structure during the rolling process, and thus the feeder structure wrapped therein is avoided from restricting degree of curling of the flexible substrate, so that the flexible substrate can be rolled as much as possible to form a tight cylinder-like structure. This design effectively reduces the overall volume of the antenna in the packaging process, allowing a smaller size and a more compact packaging volume of the packaging container and its inner cavity, thereby saving transportation and storage costs. In such configuration, the left substrate and right substrate are rolled more tightly while forming a stable support structure. This structure not only helps to maintain the overall shape and stability of the antenna, but also reduces structural deformation or damage caused by vibration or shock, thereby further improving stability and reliability of the antenna.

Particularly, the left substrate and the right substrate are each rolled towards the feeder structure to form two separate cylindrical structures, the feeder structure being disposed on the outside of the two cylindrical structures, and the coaxial cable being disposed between the two cylindrical structures.

In such configuration, the left substrate and the right substrate are rolled to both sides thereof and both terminate at the feeder structure, each eventually forming an independent cylinder structure disposed on both sides of the feeder structure. The projection of the feeder structure on the plane where the flexible substrate is disposed usually has a certain width, which separates the flexible substrate into a left substrate and a right substrate, and simultaneously forms an intermediate substrate disposed between the left substrate and the right substrate, wherein the feeder structure is disposed in the intermediate substrate. With the two independent cylindrical structures continuously rolled onto the intermediate substrate, the feeder structure is disposed on the outside of the two cylindrical structures, and the two independent cylindrical structures are spatially close to each other. This rolling method not only makes the antenna more compact after rolling, but also ensures a stable relative position between the parts, which is conducive to protecting the internal structure of the antenna. In this way, the coaxial cable is placed between the two cylindrical structures, which can make full use of the space between the two cylindrical structures, thereby reducing the space occupied by the coaxial cable and improving compactness of the overall structure, and can also effectively avoid the coaxial cable from being subjected to external impacts and extrusion during transportation, so as to protect internal signal transmission line from damage.

As an alternative, the feeder structure is disposed in the middle of the flexible substrate or in the middle of the edge of the flexible substrate, separating the flexible substrate into a left substrate and a right substrate, the left substrate/right substrate being rolled towards the feeder structure to form an inner cylindrical structure, the right substrate/left substrate wrapping around the inner cylindrical structure and the feeder structure to form an outer cylindrical structure, and the coaxial cable being disposed within the inner cylindrical structure or between the outer cylindrical structure and the inner cylindrical structure.

In such configuration, an inner and outer double-layered cylindrical structure is formed by rolling the flexible substrate on one side of the feeder structure toward the feeder structure to form an inner cylindrical structure, and then rolling the flexible substrate on the other side of the feeder structure to form an outer cylindrical structure that surrounds the outside of the inner cylindrical structure and the feeder structure. The coaxial cable in this case may be placed within the inner cylindrical structure or between the outer cylindrical structure and the inner cylindrical structure. For the case in which the antenna element is disposed on the outside of the cylindrical structure relative to the flexible substrate, the coaxial cable can be inserted into the inner cylindrical structure after the inner cylindrical structure is formed, so that the inner space of the inner cylindrical structure can be fully utilized, resulting in that the inner cylindrical structure does not have to be too compactly rolled while also has a small second direction size, and will not contact the antenna element during the insertion process to avoid affecting performance of the antenna element for sending and receiving signals due to mutual friction. The performance of transmitting and receiving signals is not affected by mutual friction. For the case in which the antenna element is disposed on the inside of the cylindrical structure relative to the flexible substrate, the coaxial cable can be placed on one side of the inner cylindrical structure and then the flexible substrate on the other side is rolled, that is, the coaxial cable placed between the outer cylindrical structure and the inner cylindrical structure. This can also avoid affecting performance of the antenna element in transmitting and receiving signals due to mutual friction. This configuration can also avoid relative friction between the antenna and the inner cavity of the packaging container in the process of loading the antenna into the packaging container, thus not affecting performance of the antenna element in transmitting and receiving signals.

As another alternative, the feeder structure is disposed at an edge of the flexible substrate, the flexible substrate in this configuration is rolled from an edge opposite to the feeder structure toward the feeder structure to form a cylindrical structure, the feeder structure is disposed on the outside of the cylindrical structure, and the coaxial cable is disposed on the outside or inside of the cylindrical structure.

By rolling the flexible substrate from the edge opposite to the feeder structure toward the feeder structure to form a cylinder structure, the flexible substrate is avoided from forming a wrap around the feeder structure during the rolling process, and the feeder structure wrapped therein is then avoided from restricting degree of curling of the flexible substrate, so that the flexible substrate can be rolled as much as possible, and the flexible substrate is more likely to be kept flat during the rolling process, resulting in more compact structure and strengthened stability of the overall structure. After rolled, the feeder structure in this case is disposed on the outside of the cylindrical structure, and the flexible substrate at the edge of the feeder structure is not easily folded or pulled, thus avoiding risk of structural damage caused by rolling. For the case in which the flexible substrate is rolled too compactly to have sufficient space inside of the cylindrical structure to accommodate the coaxial cable, the coaxial cable may be disposed on the outside of the cylindrical structure, which avoids relative friction between the coaxial cable and the inner side of the cylindrical structure, and avoids affecting performance of the antenna element for transmitting and receiving signals, especially when the antenna element is rolled inside. For the case where the flexible substrate is loosely rolled, the coaxial cable in this case may be disposed on the inner side of the cylindrical structure so as to fully utilize the space on the inner side of the cylindrical structure, thus reducing volume of the overall structure and saving transportation and storage costs.

Alternatively, the feeder structure is disposed at an edge of a flexible substrate, the flexible substrate is rolled from the edge where the feeder structure is disposed toward an edge opposite to the feeder structure to form a cylindrical structure, the feeder structure is disposed on the inside of the cylindrical structure, and the coaxial cable is disposed on the outside or inside of the cylindrical structure.

By rolling the flexible substrate from the edge where the feeder structure is disposed toward an edge opposite to the feeder structure to form a cylinder structure, the flexible substrate forms a wrap around the feeder structure during the rolling process, and the feeder structure is wrapped around the inner side of the cylinder structure to utilize the space on the inner side of the cylinder structure, and the flexible substrate does not need to be rolled too tightly to have a cylinder structure with a small size in the second direction. In this way, the coaxial cable may be disposed on the outside of the cylindrical structure or on the inside of the cylindrical structure. As the coaxial cable is connected to the feeder structure, it will be more conducive to reducing the overall volume of the antenna packaging structure, and at the same time, when the coaxial cable is wrapped along with the feeder structure in the inner side of the cylindrical structure, which can also effectively avoid adverse effects of external impacts and tugging on it, and reduce possible damage to the coaxial cable during the packaging process, and thus prolong service life of the coaxial cable.

The flexible substrate in each case of the present disclosure may be a sheet structure made of thermoplastic polyurethane elastomer (TPU), polyimide (PI) or polyester (PET, etc.), the antenna element may be a metal conductive network layer printed on the flexible substrate, and the antenna element preferably has a linewidth of each line of 3 to 12 mm.

The use of thermoplastic polyurethane elastomer (TPU), polyimide (PI) or polyester (PET, etc.) as the material for the flexible substrate gives the antenna excellent flexibility and crease resistance. This material is not only lightweight, but also able to maintain its structural integrity when subjected to external forces and is not easily damaged. This enables the antenna to maintain its original functionality and stability in scenarios that require bending and rolling.

Designing the antenna element as a metal conductive network layer printed on a flexible substrate not only simplifies manufacturing process of the antenna and reduces the production cost, but also improves integration degree of the antenna, accuracy and reliability of the antenna element, and also strengthens the bonding of the antenna element and the flexible substrate to avoid risk of damage caused by rolling. The metal conductive network layer has excellent electrical conductivity to ensure high efficiency and stability of the antenna element in signal transmission process.

With fully taking into account the balance between performance of the antenna and difficulty of manufacturing, the linewidth of each line in the antenna element may be set in 3~12 mm. The wider linewidth is conducive to reducing resistance and improving radiation efficiency of the antenna, and this linewidth range is also within capability of the existing manufacturing technology, which thus can realize higher manufacturing precision and consistency.

According to the present disclosure, by rolling the antenna into a cylinder structure and accommodating it in a packaging container, it effectively protects safety and stability of the antenna during transportation and storage, reduces risk of damage due to external forces or environmental factors, compresses the space occupied by the antenna's packaging structure, and thus improves efficiency of transportation and storage.

BRIEF DESCRIPTION OF THE DRAWINGS

The accompanying drawings are for exemplary illustration only and are not to be construed as a limitation of the present disclosure; in order to better illustrate the present disclosure, certain parts of the accompanying drawings will be omitted, enlarged or reduced, and do not represent the dimensions of the actual product; for those skilled in the art, it is understandable that certain well-known structures and their descriptions in the accompanying drawings may be omitted. In the drawings.

REFERENCE SIGNS

100 packaging container, 200 antenna, 210 flexible substrate, 220 antenna element, 230 feeder structure, 240 coaxial cable, I first direction, and II second direction.

DETAILED DESCRIPTION

In order to enable those skilled in the art to better understand the present disclosure, the following is a further detailed description of the present disclosure in connection with specific embodiments.

Figure 1:
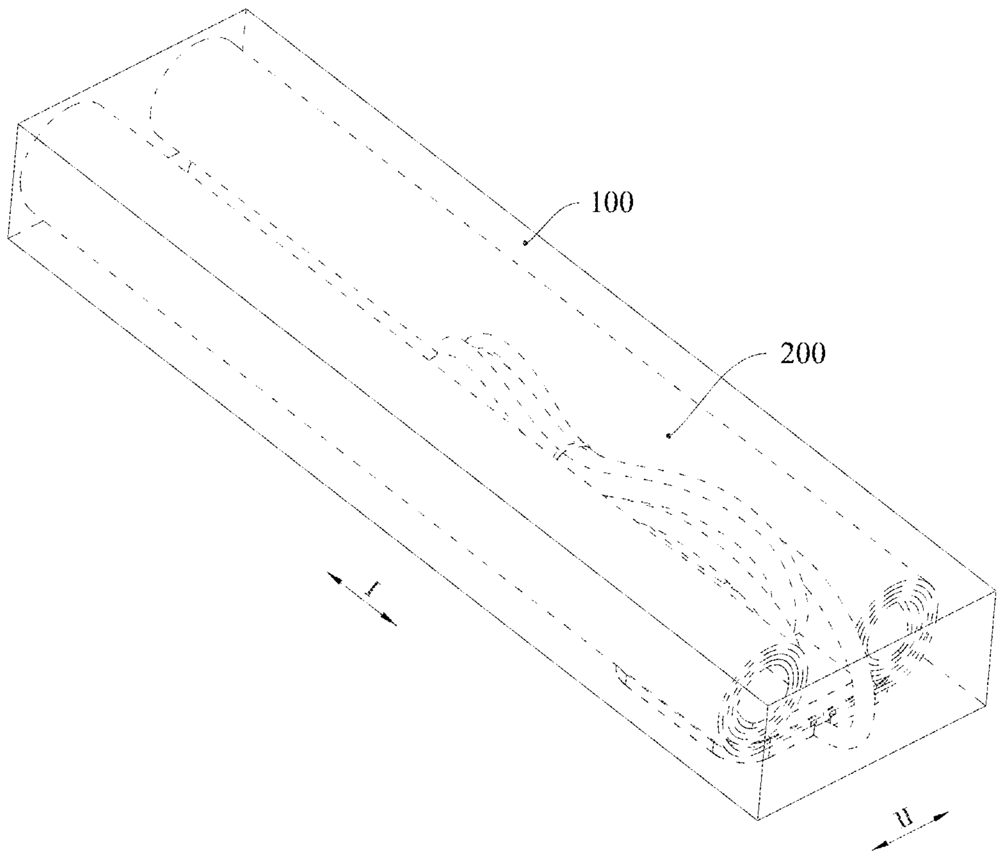
FIG. 1 is a perspective view of an antenna packaging structure according to an embodiment of the present disclosure.
Figure 2:
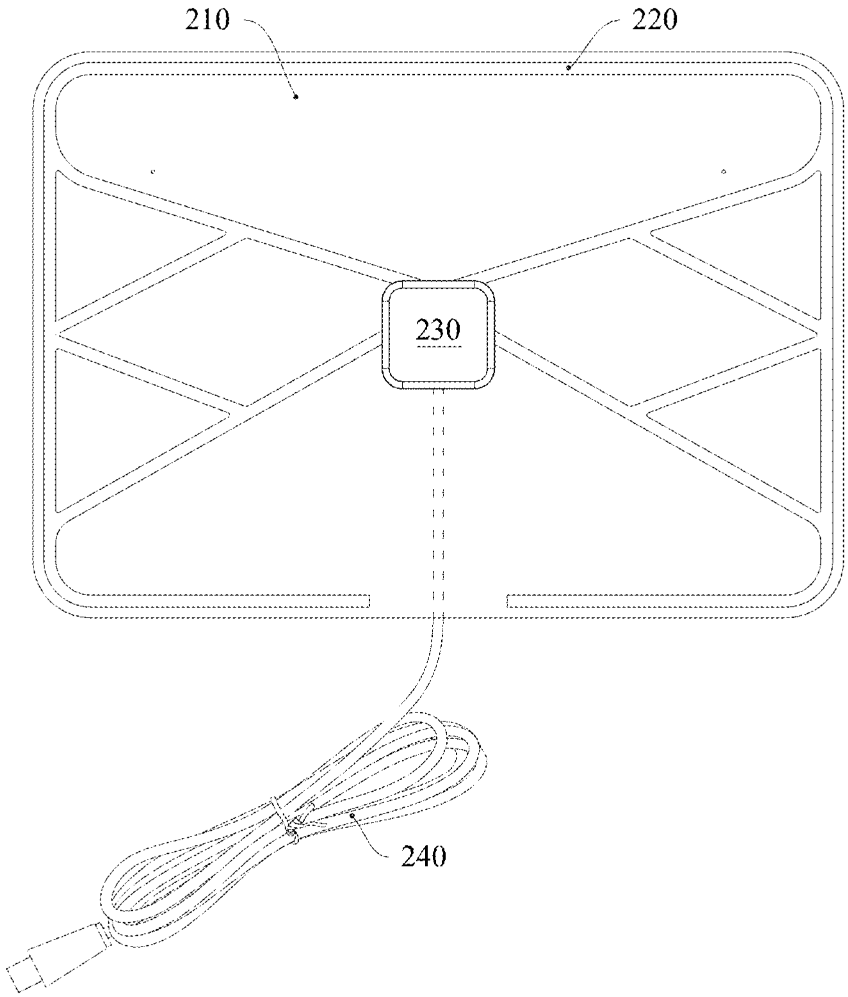
FIG. 2 is an unrolled view of an antenna with a feeder structure in the middle.
Figure 3:
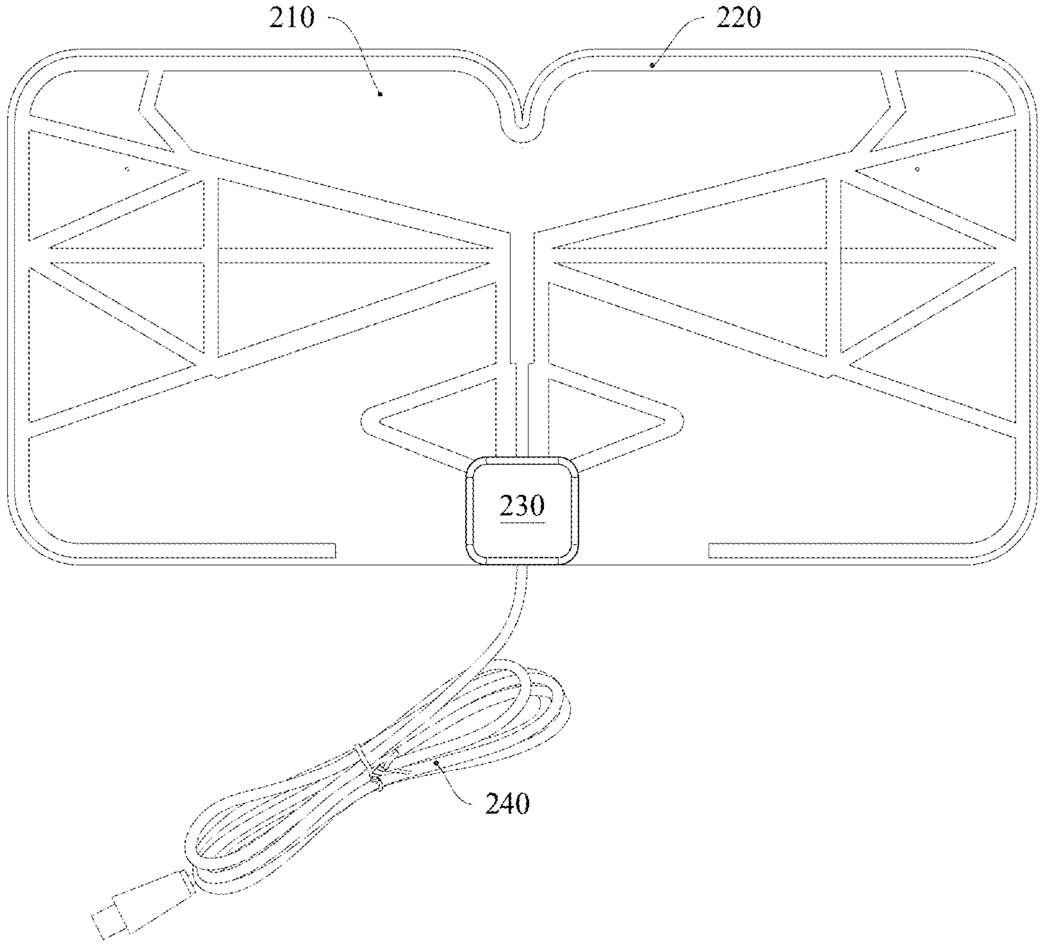
FIG. 3 is an unrolled view of an antenna with a feeder structure at the edge.

FIG. 1 illustrates a possible antenna packaging structure, which includes a packaging container 100 and an antenna 200 contained within the packaging container 100. As shown in FIGS. 2 to 3, the antenna 200 includes a flexible substrate 210, an antenna element 220 disposed on the flexible substrate 210, a feeder structure 230 connected to the antenna element 220, and a coaxial cable 240 connected to the feeder structure 230.

Referring back to FIG. 1, within the packaging container 100, the flexible substrate 210 of the antenna 200 is rolled into a cylindrical structure having a first direction (as indicated by arrow I) and a second direction (as indicated by arrow II), the first direction being parallel to the axis of the cylindrical structure and the second direction being perpendicular to the axis of the cylindrical structure. It should be noted that the cylinder structure rolled is substantially in form of a hollow cylindrical structure or a hollow cylindrical structure which has been flattened, and has an axis corresponding to the axis of the hollow cylindrical structure, the first direction corresponding to the axial direction of the hollow cylindrical structure, and the second direction corresponding to the radial direction of the hollow cylindrical structure. The antenna element 220 is rolled together with the flexible substrate 210 and is capable of maintaining its electrical properties after unrolled. As shown in FIGS. 4 to 7, the feeder structure 230 can be disposed within the cylindrical structure or on one side of the cylindrical structure, and the coaxial cable 240 can be disposed within the cylindrical structure or between the cylindrical structure and the packaging container 100.

With the antenna 200 rolled into a cylindrical structure and accommodated within the packaging container 100, it can effectively ensure safety and stability of the antenna 200 during transportation and storage, with less risk of damage due to external forces or environmental factors. Such package design of the antenna further compresses the space occupied relative to the existing package of the flat panel antenna 200, thus improving efficiency of transportation and storage. Due to characteristics of the flexible substrate 210, the antenna 200 can restore to its original shape and state after unrolled, ensuring performance and normal use of the antenna 200. In such package configuration, for normal use it only requires to remove the antenna 200 from the packaging container 100 and unroll it, without any complicated operation or adjustment. In addition, such design is applicable to antennas 200 of various sizes and shapes, which thus has wide applicability and flexibility.

Figure 8:
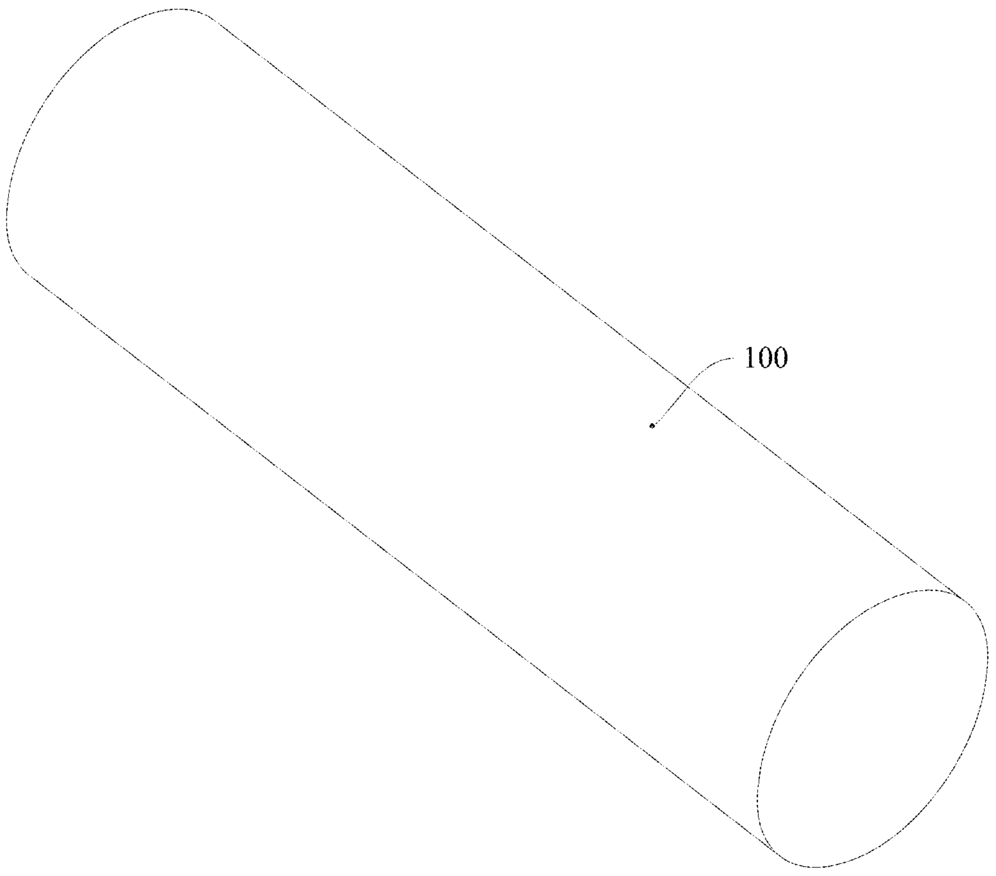
FIG. 8 is a perspective view of a cylindrical packaging container.

The packaging container 100 may be a packaging box, a packaging bag, or other forms of packaging containers formed by blister packaging and the like. The packaging container can be designed as hollow polyhedrons such as prisms, frustums of pyramids, pyramids, etc., or as hollow bodies of revolution such as cylinders, frustums of cones, cones, spheres, etc., however, preferably in form of a square-cylindrical structure (shown in FIG. 1) or a circular-cylindrical structure (shown in FIG. 8). Square-cylindrical or circular-cylindrical packaging container 100 better matches the shape of the antenna 200 after rolled into the cylindrical structure. Such design not only enhances space utilization of the packaging container 100 and reduces unnecessary waste of packaging materials, but also facilitates stacking and handling improve logistics efficiency.

Regardless of square-cylindrical or circular-cylindrical or other shapes, the packaging container 100 has an inner cavity matching the dimensions in the first direction and second direction, so that a close fit between the packaging and the antenna product can achieve. Especially, the dimensions in the second direction of the packaging container 100 is required to subject to accommodate the feeder structure 230, ensuring that the antenna 200 can be completely stowed in the packaging container 100 in the rolled state, thereby minimizing the packaging volume. Such precise size matching, on the one hand, further improves space utilization of the packaging container 100 and reduces unnecessary waste of packaging materials. On the other hand, it strengthens protective effect of the packaging on the antenna 200, which can effectively prevent the antenna 200 from moving or shaking inside the packaging container 100, thus ensure stability of the antenna 200 inside the packaging container 100, and reduce risk of damage due to an external impact during transportation.

The dimensions of the cylindrical structure of the packaging container 100 can be preferably designed in a range where the dimensions in the first direction are 3 to 15 times the dimensions in the second direction, ensuring that the flexible substrate 210 is rolled as short and compact as possible. On the one hand, size of the first direction needs to be controlled within a certain ratio, so that the antenna will be rolled in the packaging process to make the size of the first direction as smaller as possible after rolled; on the other hand, with the size of the second direction much smaller than the first direction, the antenna 200 will be able to form a compact cylinder structure after rolled to significantly reduce the size of the second direction thereof. The above two aspects both will significantly reduce the space occupied by the antenna 200 inside the packaging container 100, so that the packaging container 100 and its inner cavity dimensions can be designed to be smaller both in the first direction and in the second direction, which is very advantageous for saving space for transportation and storage, as well as reducing the cost of packaging. In addition, being compactly rolled can also improve impact strength of the antenna 200 during transportation and storage, which is more conducive to avoiding damage or deformation caused by external forces during transportation and storage and protecting the flexible substrate 210 and the antenna element 220 of the antenna 200.

The size of the second direction may be particularly designed between 1.5 to 8 cm, making the antenna 200 in a moderate and stable size after being rolled into a cylindrical structure. Such a size design is neither too large to cause the packaging container 100 to be too bulky, nor too small to affect performance or structural integrity of the antenna 200. This moderate size design helps to achieve standardization and uniformity of the packaging container 100, and facilitates production, transportation, and management. During the rolling process, the moderate size of the second direction ensures a stable relative position of the components of the antenna 200 and avoids displacement or deformation due to vibration or impact during transportation, which helps to protect structural integrity of the antenna 200 and ensures that it can work properly after being unrolled. After completing rolling, the moderate size of the second direction also makes the size of the packaging container 100 moderate, which is convenient for sales transportation and storage, as well as convenient for the user to carry and move. For users, whether working outdoors or using indoors, it can be easily carried to meet his communication needs anytime and anywhere.

Figure 4:
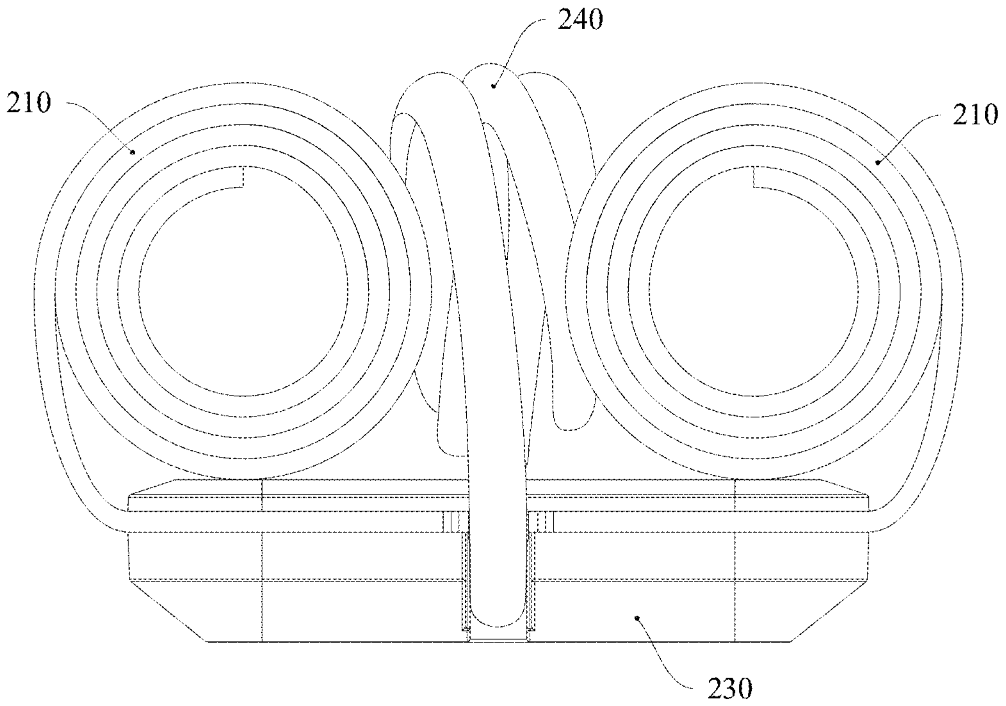
FIG. 4 is a rolled view of an antenna according to an embodiment of the present disclosure.

The feeder structure 230 may be disposed in the middle of the flexible substrate 210, as shown in FIG. 2, or in the edge of the flexible substrate 210, specifically in the middle of the edge, as shown in FIG. 3. Regardless of whether it is disposed in the middle of the flexible substrate 210 or in the middle of the edge, the flexible substrate 210 will be naturally separated into a left substrate and a right substrate. With reference to FIG. 4, the left substrate and the right substrate described herein may be rolled toward the feeder structure 230 separately to avoid the flexible substrate 210 forming wrapping around the feeder structure 230 during the rolling process, and thus avoid the feeder structure 230 wrapped therein from restricting degree of rolling of the flexible substrate 210, so that the flexible substrate 210 may be rolled as much as possible to form a tight cylinder structure. Such design effectively reduces the overall volume of the antenna 200 during packaging, allowing a smaller size and a more compact packaging volume of the packaging container 100 and its inner cavity, thereby saving transportation and storage costs. With such configuration, the left substrate and the right substrate are rolled more tightly while forming a stable support structure, which not only maintains the overall shape and stability of the antenna 200, but also reduces structural deformation or damage caused by vibration or impact, thereby further improving stability and reliability of the antenna 200.

Particularly, referring to FIG. 4, the left substrate and right substrate are both rolled to either side thereof and terminate at the feeder structure 230, each eventually forming a separate cylindrical structure on either side of the feeder structure 230. The projection of the feeder structure 230 on the plane where the flexible substrate 210 is disposed usually has a certain width, which separates the flexible substrate 210 into a left substrate and a right substrate, and simultaneously forms an intermediate substrate on the flexible substrate 210 disposed between the left substrate and the right substrate, on which the feeder structure 230 is disposed. The two separate cylindrical structures can continue to be rolled onto the intermediate substrate so that the feeder structure 230 is disposed on the outside of the two cylindrical structures, while allowing the two separate cylindrical structures to be spatially close together. This rolling method not only makes the rolled antenna 200 more compact, but also ensures a stable relative position between the parts, which is conducive to protecting the internal structure of the antenna 200. In this embodiment, the coaxial cable 240 is placed between the two cylindrical structures, which can fully utilize space between the two cylindrical structures, thereby reducing space occupation of the coaxial cable 240 and improving compactness of the overall structure, and can also effectively avoid the coaxial cable 240 from being subjected to external impacts and extrusion in the course of transportation, thereby protecting signal transmission line inside it from damage.

Figure 5:
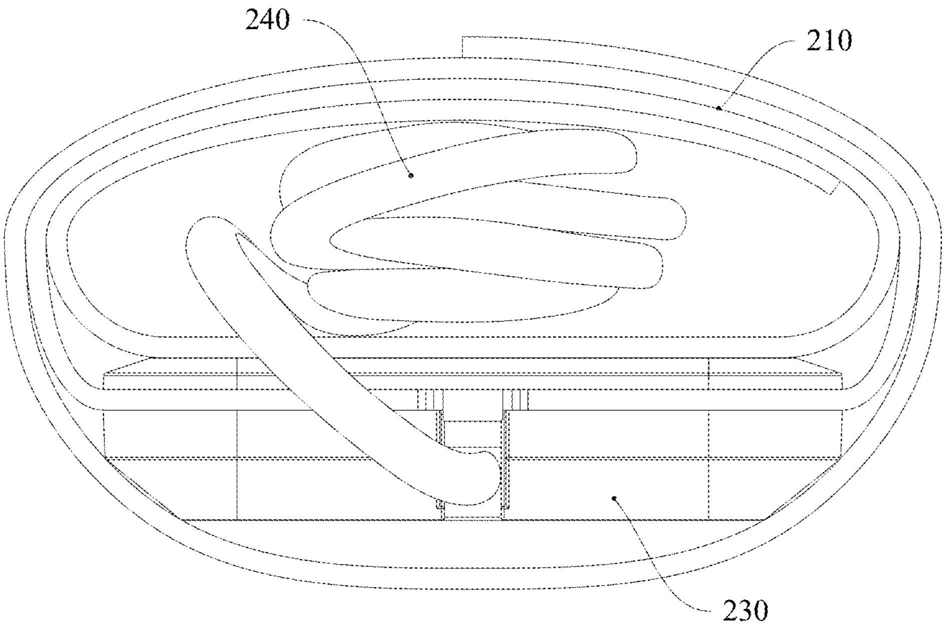
FIG. 5 is a rolled view of an antenna according to an alternative embodiment of the present disclosure.

In addition to being rolled towards the feeder structure 230 respectively, the flexible substrate 210 may be rolled in such a way that the left substrate/right substrate is rolled towards the feeder structure 230 to form an inner cylindrical structure, and the remaining right substrate/left substrate is wrapped around the inner cylindrical structure and the feeder structure 230 to form an outer cylindrical structure, in such way an inner and outer double-layered cylindrical structure if formed as shown in FIG. 5. The coaxial cable 240 in this embodiment may be placed inside the inner cylindrical structure or may be placed between the outer cylindrical structure and the inner cylindrical structure. In the case where the antenna element 220 is disposed on the outside of the cylindrical structure relative to the flexible substrate 210, the coaxial cable 240 can be inserted into the inner cylindrical structure after the inner cylindrical structure has been formed, so as to make full use of the inner space of the inner cylindrical structure, so that the inner cylindrical structure does not need to be rolled too compactly while has a small second direction dimension, and also does not contact the antenna element 220 during insertion process to avoid affecting performance of the antenna element 220 in transmitting and receiving signals due to mutual friction. In the case where the antenna element 220 is disposed on the inside of the cylindrical structure relative to the flexible substrate 210, the coaxial cable 240 can be placed on one side of the cylindrical structure and then rolled around the flexible substrate 210 on the other side, that is, the coaxial cable 240 placed between the outer cylindrical structure and the inner cylindrical structure, which can also avoid mutual friction on performance of the antenna element 220 transmitting and receiving signals. With the antenna element 220 disposed on the inner side of the cylindrical structure relative to the flexible substrate 210, it can avoid relative friction between the antenna 200 and the inner cavity of the packaging container 100 during loading of the antenna 200 into the packaging container 100, and thus ensure not to affect performance of the antenna element 220 in transmitting and receiving signals.

Figure 6:
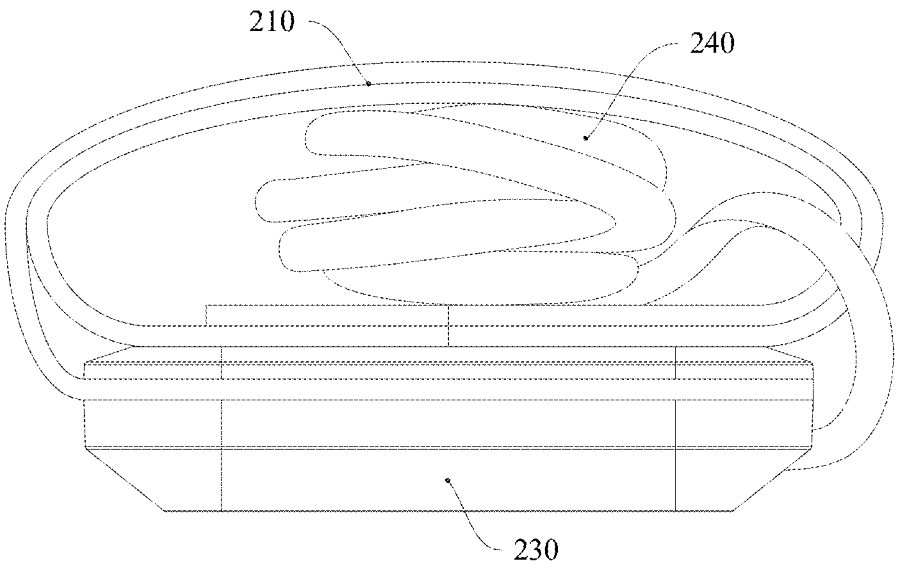
FIG. 6 is a rolled view of an antenna according to an alternative embodiment of the present disclosure.

For the case where the feeder structure 230 is disposed at the edge of the flexible substrate 210, the flexible substrate 210 may also be rolled from an edge opposite to the feeder structure 230 toward the feeder structure 230 to form a cylinder structure, as shown in FIG. 6, which can avoid the flexible substrate 210 from forming a wrap around the feeder structure 230 during the rolling process, and thus avoid the feeder structure 230 wrapped therein from restricting degree of rolling of the flexible substrate 210. In such way, the flexible substrate 210 can be rolled as much as possible, and the flexible substrate 210 is easy to keep flat during the rolling process, making the entire structure more compact and strengthening stability of the overall structure. After rolled, the feeder structure 230 in this embodiment is disposed on the outside of the cylindrical structure, which can avoid risk of structural damage caused by rolling as the flexible substrate 210 at the edge of the feeder structure 230 is not easily folded or pulled. In the case where the flexible substrate 210 is rolled too compactly to have sufficient space inside of the cylindrical structure to accommodate the coaxial cable 240, the coaxial cable 240 may be disposed on the outside of the cylindrical structure, which avoids relative friction between the coaxial cable 240 and the inside of the cylindrical structure, and avoids affecting performance of the antenna element 220 for transmitting and receiving signals, especially when the antenna element 220 is rolled inside the cylindrical structure. While in the case where the flexible substrate 210 is rolled more loosely, the coaxial cable 240 in such case may be disposed on the inner side of the cylindrical structure so as to fully utilize the space on the inner side of the cylindrical structure, thus reducing volume of the overall structure and saving transportation and storage costs.

Figure 7:
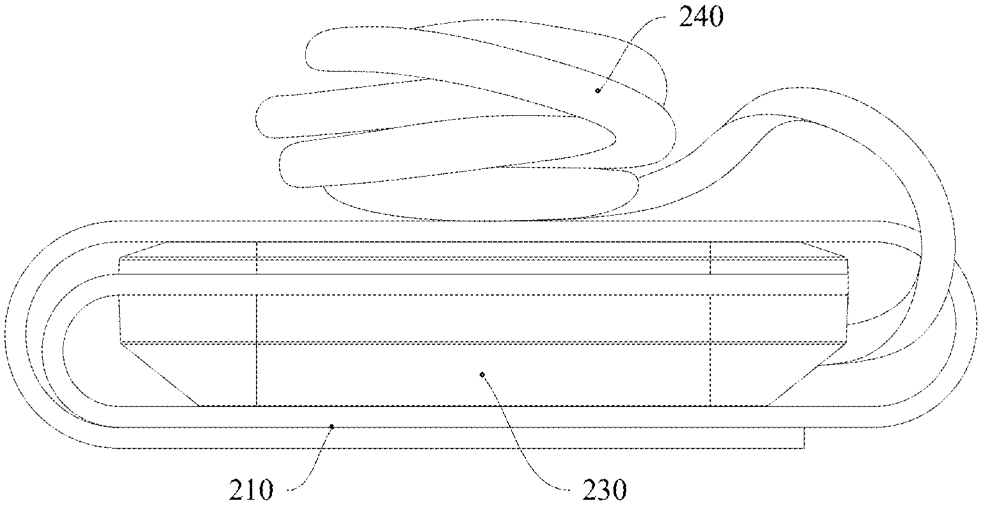
FIG. 7 is a rolled view of an antenna according to an alternative embodiment of the present disclosure.

For the case where the feeder structure 230 is disposed at the edge of the flexible substrate 210, the flexible substrate 210 may also be rolled from the edge where the feeder structure 230 is disposed toward the edge opposite to the feeder structure 230 to form a cylindrical structure, as shown in FIG. 7. In such way, the flexible substrate 210 surrounds the feeder structure 230 during the rolling process to make the feeder structure 230 wrapped around the inner side of the cylindrical structure, so that the space on the inner side of the cylindrical structure can be utilized and thus reduce the whole volume of the antenna after rolled, and the flexible substrate 210 can have a relatively small size in the second direction without having to be rolled too compact. In this case, the coaxial cable 240 may be disposed on the outside of the cylindrical structure or on the inside of the cylindrical structure. However, it will be more conducive to reducing the overall volume of the packaging structure of the antenna 200, when the coaxial cable 240 connected to the feeder structure 230 is wrapped together with the feeder structure 230 in the inner side of the cylindrical structure, which can also effectively avoid adverse effects caused by external impacts and pulls on it. In such configuration, it can reduce possible damage to the coaxial cable 240 during the packaging process, and thus extend service life of the coaxial cable 240.

The flexible substrate 210 may be a sheet-like structure made of thermoplastic polyurethane elastomer (TPU), polyimide (PI), or polyester (PET, etc.). The thermoplastic polyurethane elastomer (TPU), polyimide (PI), or polyester (PET, etc.), as a material of the flexible substrate 210, can give the antenna 200 excellent flexibility and crease resistance. Such material is not only lightweight, but also capable of maintaining its structural integrity and not easily damaged when subjected to external forces. This enables the antenna 200 to maintain its original functionality and stability in scenarios where it needs to be bent and rolled.

The antenna element 220 may be a metal conductive network layer printed on the flexible substrate 210, which not only simplifies manufacturing process of the antenna 200 and reduces the production cost, but also improves integration degree of the antenna 200, precision and reliability of the antenna element 220, and also enhances the bonding force of the antenna element 220 with the flexible substrate 210 to avoid risk of damage caused by rolling. The metal conductive network layer has excellent conductive properties to ensure high efficiency and stability of the antenna element 220 in the signal transmission process.

With fully taking into account the balance between performance of the antenna 200 and difficulty of manufacturing, the linewidth of each line in the antenna element 220 may be set in 3~12 mm. The wider linewidth is conducive to lowering resistance and improving radiation efficiency of the antenna 200, and this linewidth range is also within capability of existing manufacturing technology, which thus can realize higher manufacturing precision and consistency.

Obviously, the above embodiments of the present disclosure are merely examples for the purpose of clearly illustrating the present disclosure, and are not intended to be a limitation of the manner of implementation of the present disclosure. To a person of ordinary skill in the art, other variations or changes in different forms may be made on the basis of the above description. It is neither necessary nor possible to exhaust all of the embodiments herein. Any modifications, equivalent substitutions and improvements made within the spirit and principles of the present disclosure shall be included in the scope of protection of the claims of the present disclosure.

What is claimed is:

1. An antenna packaging structure, comprising a packaging container and an antenna contained in the packaging container, the antenna comprising a flexible substrate, an antenna element disposed on the flexible substrate, a feeder structure connected to the antenna element and a coaxial cable connected to the feeder structure, wherein inside the packaging container, the flexible substrate of the antenna is rolled into a cylindrical structure having a first direction parallel to an axis of the cylindrical structure and a second direction perpendicular to the axis of the cylindrical structure, the antenna element is rolled with the flexible substrate and retains an electrical property after unrolled, the feeder structure is disposed on an inside of the cylindrical structure or disposed to a side of the cylindrical structure, and the coaxial cable is disposed inside the cylindrical structure or disposed between the cylindrical structure and the packaging container; and wherein the feeder structure is disposed in a middle of the flexible substrate or in a middle of an edge of the flexible substrate, separating the flexible substrate into a left substrate and a right substrate, the left substrate and the right substrate being rolled from a side opposite to the feeder structure towards the feeder structure, respectively, to form two separate cylindrical structures, the feeder structure being disposed on an outer side of the two cylindrical structures, and the coaxial cable being disposed between the two cylindrical structures.

2. The antenna packaging structure according to claim 1, wherein the packaging container has an inner cavity matching dimensions in the first direction and the second direction, with the packaging container being sized in the second direction in such a way as to be able to accommodate the feeder structure.

3. The antenna packaging structure according to claim 1, wherein dimensions in the first direction of the cylindrical structure are 3 to 15 times dimensions in the second direction of the cylindrical structure.

4. The antenna packaging structure according to claim 1, wherein dimensions in the second direction of the cylindrical structure are between 1.5 and 8 cm.

5. The antenna packaging structure according to claim 1, wherein the flexible substrate is a sheet structure made of thermoplastic polyurethane elastomer, polyimide or polyester.

6. The antenna packaging structure according to claim 1, wherein the antenna element is a metallic conductive network layer printed on the flexible substrate.

7. The antenna packaging structure according to claim 1, wherein the antenna element has a linewidth of 3 to 12 mm.

8. An antenna packaging structure, comprising a packaging container and an antenna contained in the packaging container, the antenna comprising a flexible substrate, an antenna element disposed on the flexible substrate, a feeder structure connected to the antenna element and a coaxial cable connected to the feeder structure, wherein inside the packaging container, the flexible substrate of the antenna is rolled into a cylindrical structure having a first direction parallel to an axis of the cylindrical structure and a second direction perpendicular to the axis of the cylindrical structure, the antenna element is rolled with the flexible substrate and retains an electrical property after unrolled, the feeder structure is disposed on an inside of the cylindrical structure or disposed to a side of the cylindrical structure, and the coaxial cable is disposed inside the cylindrical structure or disposed between the cylindrical structure and the packaging container; and wherein the feeder structure is disposed in a middle of an edge of the flexible substrate, separating the flexible substrate into a left substrate and a right substrate, one of the left substrate and the right substrate being rolled towards the feeder structure to form an inner cylindrical structure, the other of the right substrate and left substrate surrounding around the inner cylindrical structure and the feeder structure to form an outer cylindrical structure, and the coaxial cable being disposed within the inner cylindrical structure or between the outer cylindrical structure and the inner cylindrical structure.

9. The antenna packaging structure according to claim 8, wherein the packaging container has an inner cavity matching dimensions in the first direction and the second direction, with the packaging container being sized in the second direction in such a way as to be able to accommodate the feeder structure.

10. The antenna packaging structure according to claim 8, wherein dimensions in the first direction of the cylindrical structure are 3 to 15 times dimensions in the second direction of the cylindrical structure.

11. The antenna packaging structure according to claim 8, wherein dimensions in the second direction of the cylindrical structure are between 1.5 and 8 cm.

12. The antenna packaging structure according to claim 8, wherein the flexible substrate is a sheet structure made of thermoplastic polyurethane elastomer, polyimide or polyester.

13. The antenna packaging structure according to claim 8, wherein the antenna element is a metallic conductive network layer printed on the flexible substrate.

14. The antenna packaging structure according to claim 8, wherein the antenna element has a linewidth of 3 to 12 mm.

* * * * *